(12) United States Patent
Feldman

(10) Patent No.: US 6,650,840 B2
(45) Date of Patent: Nov. 18, 2003

(54) METHOD FOR IDENTIFYING FAULTS IN A BRANCHED OPTICAL NETWORK

(75) Inventor: Robert D. Feldman, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/277,044

(22) Filed: Mar. 26, 1999

(65) Prior Publication Data

US 2002/0075534 A1 Jun. 20, 2002

Related U.S. Application Data

(60) Provisional application No. 60/079,719, filed on Mar. 27, 1998.

(51) Int. Cl.[7] .......................... H04B 10/08; H04B 10/00
(52) U.S. Cl. ............................. 398/21; 398/16; 398/10; 398/168; 398/169
(58) Field of Search .................... 359/109–195; 398/16, 21, 168, 169, 10

(56) References Cited

U.S. PATENT DOCUMENTS

| | | | | |
|---|---|---|---|---|
| 4,749,247 A | * | 6/1988 | Large ........................ | 356/73.1 |
| 5,285,305 A | * | 2/1994 | Cohen et al. ................ | 359/110 |
| 5,521,734 A | * | 5/1996 | Frigo ........................... | 359/114 |
| 5,680,234 A | * | 10/1997 | Darcie et al. ................ | 359/110 |
| 5,905,586 A | * | 5/1999 | Even ........................... | 359/113 |
| 5,963,684 A | * | 10/1999 | Ford et al. .................... | 359/11 |
| 5,969,836 A | * | 10/1999 | Foltzer ........................ | 359/114 |
| 6,009,220 A | * | 12/1999 | Chan et al. .................. | 385/24 |
| 6,185,020 B1 | * | 2/2001 | Horiuchi et al. ............ | 359/110 |

OTHER PUBLICATIONS

J. Walker et al., "Mechanical Anti–Reflection Switch (MARS) Device for Fiber–in–the–Loop Application", IEEE/LEOS 1996 Summer Topical Meetings, Aug. 1996.*
T. H. Wood et al., "Bidirectional Fibre–Optical Transmission Using Multiple–Quantum–Well (MQW) Modulator/Detector", *Electronic Letters*, vol. 22, pp. 528–529 (1986).
J. A. Walker et al., "A 1.5Mb/s Operation of a MARS Device for Communication Systems Applications", *Journal of Lightwave Technology*, vol. 14, pp. 2382–2386 (1996).
I. Sankawa et al., "Fault Location Technique for In–Service Branched Optical Fiber Networks", *IEEE Photonics Technology Letters*, vol. 2, pp. 766–768 (1990).

* cited by examiner

*Primary Examiner*—Leslie Pascal
*Assistant Examiner*—Shi K. Li

(57) ABSTRACT

A method for identifying faults in a branched optical network having a central office optically connected to a plurality of optical network units by a plurality of optical paths. The method involves transmitting an optical signal from the central office to the optical network units reflecting a portion of the transmitted optical signal back to the central office. This reflected signal is then used to determine whether a fault exists in the branched optical network.

10 Claims, 8 Drawing Sheets

METHOD FOR IDENTIFYING FAULTS IN A BRANCHED OPTICAL NETWORK

TECHNICAL FIELD

This application claims the benefit of U.S. Provisional Application No. 60/079,719, filed Mar. 27, 1998.

This invention relates generally to the field of optical networking and in particular to a method of identifying faults in an optical network.

BACKGROUND OF THE INVENTION

Loss of signal in an optical network may result, for example, from a cut to an optical fiber or a failure of terminal equipment. When a loss of signal occurs in a branched optical network, it can be very difficult to distinguish between these two types of failure. Knowing the cause of a loss of signal is important because it permits a service provider to determine, for example, whether to dispatch a repair crew and what type of training and equipment that may be needed by that repair crew.

An example of such a branched optical network is shown in FIG. 1. Shown in that figure is an example of what is often called a "passive optical network" (PON) 100. In the PON shown in FIG. 1, a single fiber 110 connects a central office 120 to a passive optical splitter 130 that may be located in a remote node. From an output of the splitter 130, individual optical fibers 135(1) . . . 135(n) are further connected to a respective individual optical networking unit (ONU) 140. As is known, an ONU may serve a single home, several homes, or an entire building or residences or offices (not shown).

In this example, "downstream" transmission (from central office 120 to optical networking unit 140) occurs at 1.5 μm, and "upstream" transmission occurs at 1.3 μm from transmitters 121 and 142 respectively. Corresponding upstream and downstream reception occurs at corresponding receivers 141 and 122. Upstream and downstream signals are separated using 1.5/1.3 μm coarse wavelength division multiplexers 143 and 123, respectively.

One prior art method of determining whether an optical fiber break has occurred is to use optical time domain reflectometry (OTDR). As can be appreciated by those skilled in the art, a broken optical fiber will cause a reflection that may be detected through the use of OTDR. Unfortunately, OTDR is not fool-proof in optical networks. For example, in the PON shown in FIG. 1, if there is a loss of signal from an individual ONU connected on one of the individual optical fibers 135(1) . . . 135(n), an OTDR signal sent from the central office 120 would superimpose reflected signals resulting from breaks in multiple branches of the network into a single reflected signal, thereby making the reflected signal ambiguous as to which particular branch contains a broken optical fiber.

In an article entitled "Fault Location Technique for In-Service Branched Optical Fiber Networks", that appeared in IEEE Photon. Tech. Left., vol. 2, pp. 766–768, 1990, I. Sankawa, S. I. Furukawa Y. Koyamada and J. Izumita suggested that one can overcome this ambiguity by collecting OTDR traces prior to a failure and storing the collected traces in computer memory for future reference. When a failure occurs, an OTOR trace may be compared with a stored trace in an attempt to determine whether or not a fiber break has occurred. Drawbacks to such an approach are numerous. Specifically, the approach 1) requires the storage of a number of OTDR traces at a central or otherwise accessible location that may be serving a large number of networks; 2) the traces will have to be updated frequently enough to ensure their accuracy; and 3) sophisticated operators or computer algorithms are needed to correctly interpret the OTDR traces.

An alternative approach is to send a repair crew to the ONU whenever a failure is detected. Of course, such a repair crew must be properly trained and equipped both for ONU replacement and in using OTDR. While such a repair crew may in fact correctly isolate and repair a failure in the optical network, it is nevertheless desirable to understand the nature of the failure prior to dispatching the repair crew.

Consequently a continuing need exists for methods that facilitate fault identification in optical networks and in particular, branched optical networks.

SUMMARY OF THE INVENTION

The above problems are overcome and advance is made over the prior art in accordance with the principles of my invention directed to a method for identifying faults in a branched optical network. The method involves the transmission of an optical signal from a central office to a plurality of optical network units along a plurality of optical paths within a branched optical network. Selectively, portions of the optical signal are reflected back to the central office from modulators situated within the optical network units. From these reflected signals, the method advantageously determines the existence of faults within the branched optical network.

In accordance with the present invention, the modulators may be micro-mechanical, anti-reflective modulator switches (MEMS) devices, thereby permitting a variety of selection and determination methods.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

Figure 1:
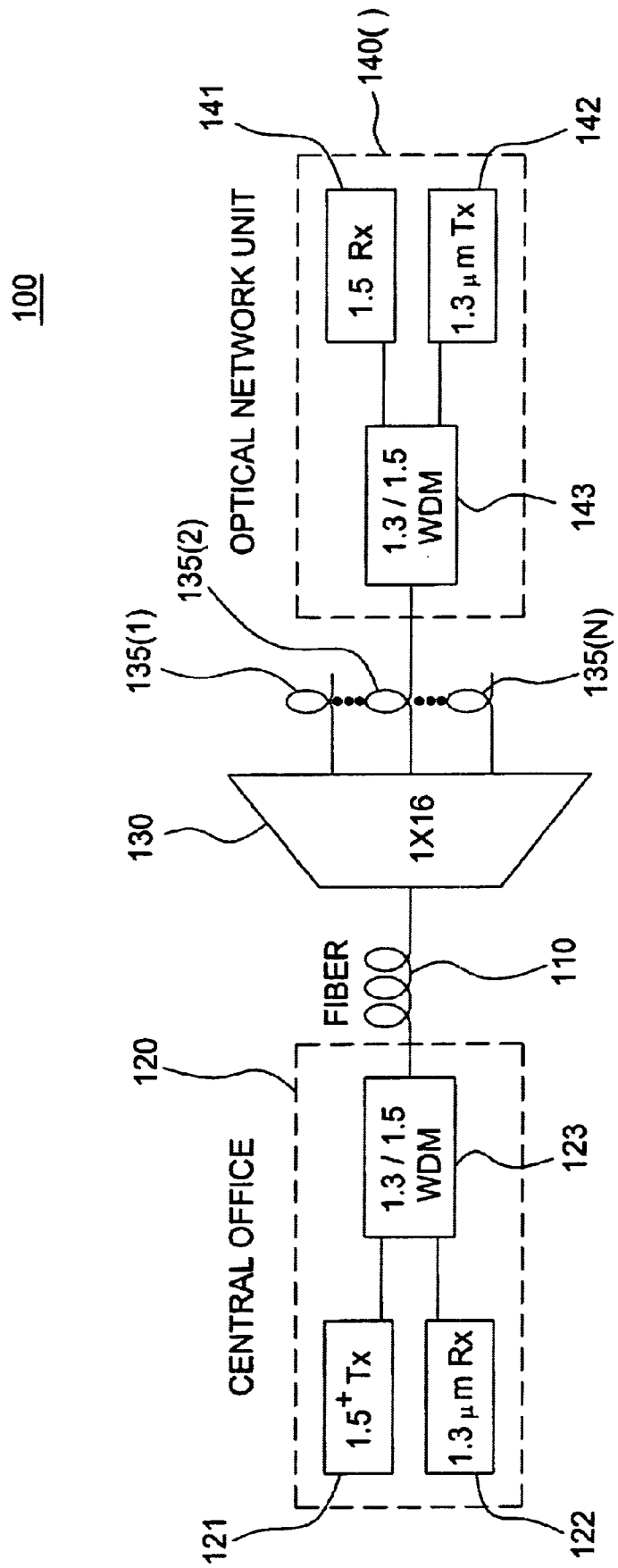
FIG. 1 shows in simplified block diagram form, a prior art branched optical network.
Figure 2:
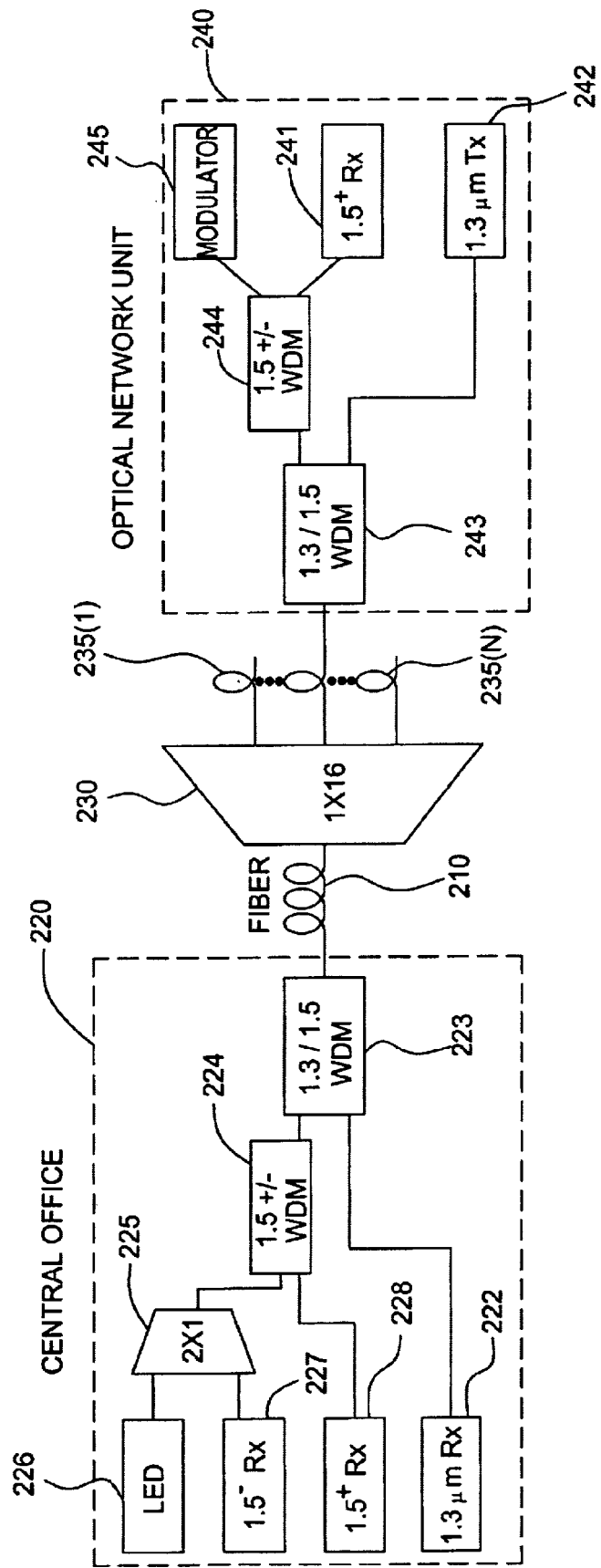
FIG. 2 shows in simplified block diagram form a branched optical network according to the present invention.

With reference now to FIG. 2, there is shown a block diagram of a passive optical network incorporating the teachings of the present invention. While somewhat similar to the optical network depicted in FIG. 1, each optical network unit 240 shown within FIG. 2 and coupled to a respective optical fiber 235(1 . . . N) includes a reflective modulator 245 and the central office 220 includes a 1.5 $\mu$m light emitting diode (LED) 226. The 1.5 $\mu$m wavelength of the LED 226 is further subdivided into two smaller windows, denoted in FIG. 2 as 1.5+ and 1.5−, using additional WDM devices 224 and 244 within the central office 220 and the ONU 240, respectively.

In the network depicted n FIG. 2, a laser at the central office is chosen to match the 1.5+ window, that is, a longer portion of the 1.5 $\mu$m window. A portion of the light emanating from the LED 226 within the central office 220 matches the 1.5− window of the 1.5+/− WDJM 224, and is transmitted downstream to the modulator 245 situated within the GNU 240. The modulator 245 is further driven to produce either a tone or a low-speed data signal that is transmitted upstream on the same fiber.

One might expect that beating between backscattered light and an intended return signal will return unacceptable noise levels (See, e.g., T. H. Wood, E. G. Carr, B. L. Kasper, R. A. Linke, C. A. Burrus, and K. L Walker, "Bidirectional Fibre-Optical Transmission Using A Multiple-Quantum-Well (MQW) Modulator/Detector", Electron. Lett., Vol. 22, pp. 528–529, 1986). However, the use of a broad-spectrum source, such as an LED 226, renders this noise insignificant as described in the U.S. patent application Ser. No. 081937, 299 entitled "Suppression of Coherent Rayleigh Noise in Bidirectional Communication Systems", assigned to the present assignee and incorporated herein by reference.

The reflective modulator 245 utilized with my invention may be of a variety known in the art. One particularly useful device is a micromechanical anti reflective switch modulator (MARS) such as that described by J. A. Walker, K. W. Goossen, S. C. Arney, N. J. Frigo, and P. P. Iannone in an article entitled "A 1.5 Mb/s Operation of a MARS Device for Communication Systems Application", that appeared in J. Lightwave Technol., Vol., 14, pp 2382–2386 (1996).

In operation, the LED 226 was operated at an output power of −11 dBm. The approximately 15 nm wide filter provided by the 1.5+/− WDM 224, 244 reduced the output power by approximately 12.5 dB. With a wider filter passband or an LED 226 whose peak wavelength more closely matches the transmission peak of the filter, this loss could be reduced significantly. Nevertheless, the transmitted power was sufficient to determine the integrity of the optical fiber path.

Figure 3:
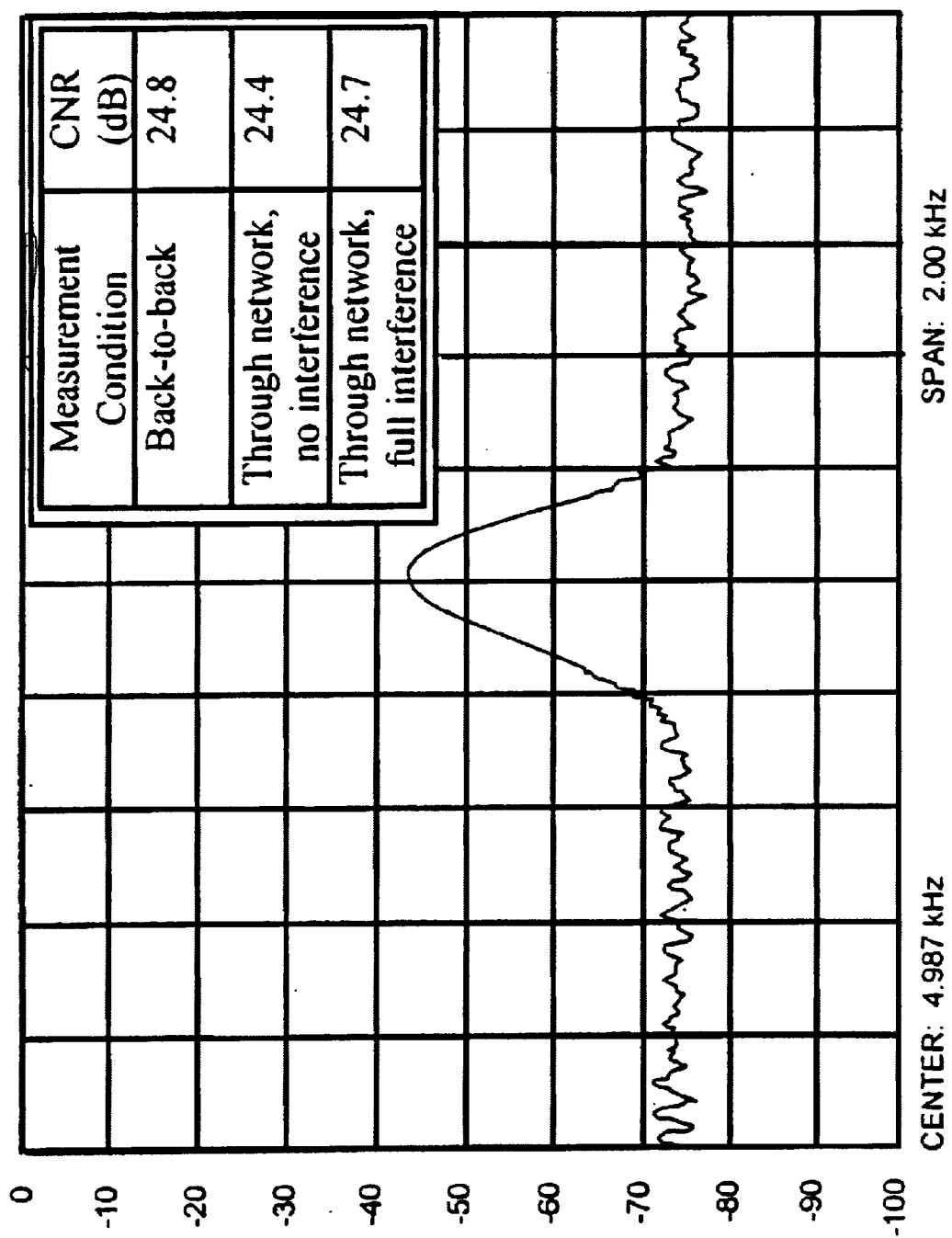
FIG. 3 shows a graph of an example spectrum for the branched optical spectrum of FIG. 2.

The modulator 245 was excited with a "1010 . . . " data stream at 10 kb/s thereby producing a 5 kHz fundamental tone which was subsequently received at the central office. FIG. 3 shows an example spectrum for such a configuration. Spectra were recorded and carrier to noise (CNR) ratios were measured both through the network and in a "back-to-back" configuration. In the back-to-back configuration, the fiber network 210 and the 1×16 splitter 230 were bypassed, and optical attenuation adjusted to simulate the loss through the network. The resulting spectra were substantially the same, and the CNRs, as measured in a 300 Hz bandwidth, varied by only 0.2 dB. As can be appreciated, backscattering noise from the optical fiber network was insignificant. Also, there apparently was no CNR degradation when upstream and downstream transmitters were transmitting at 155 Mb/s, which indicates that adequate optical isolation is provided by the WDM devices.

Figure 4:
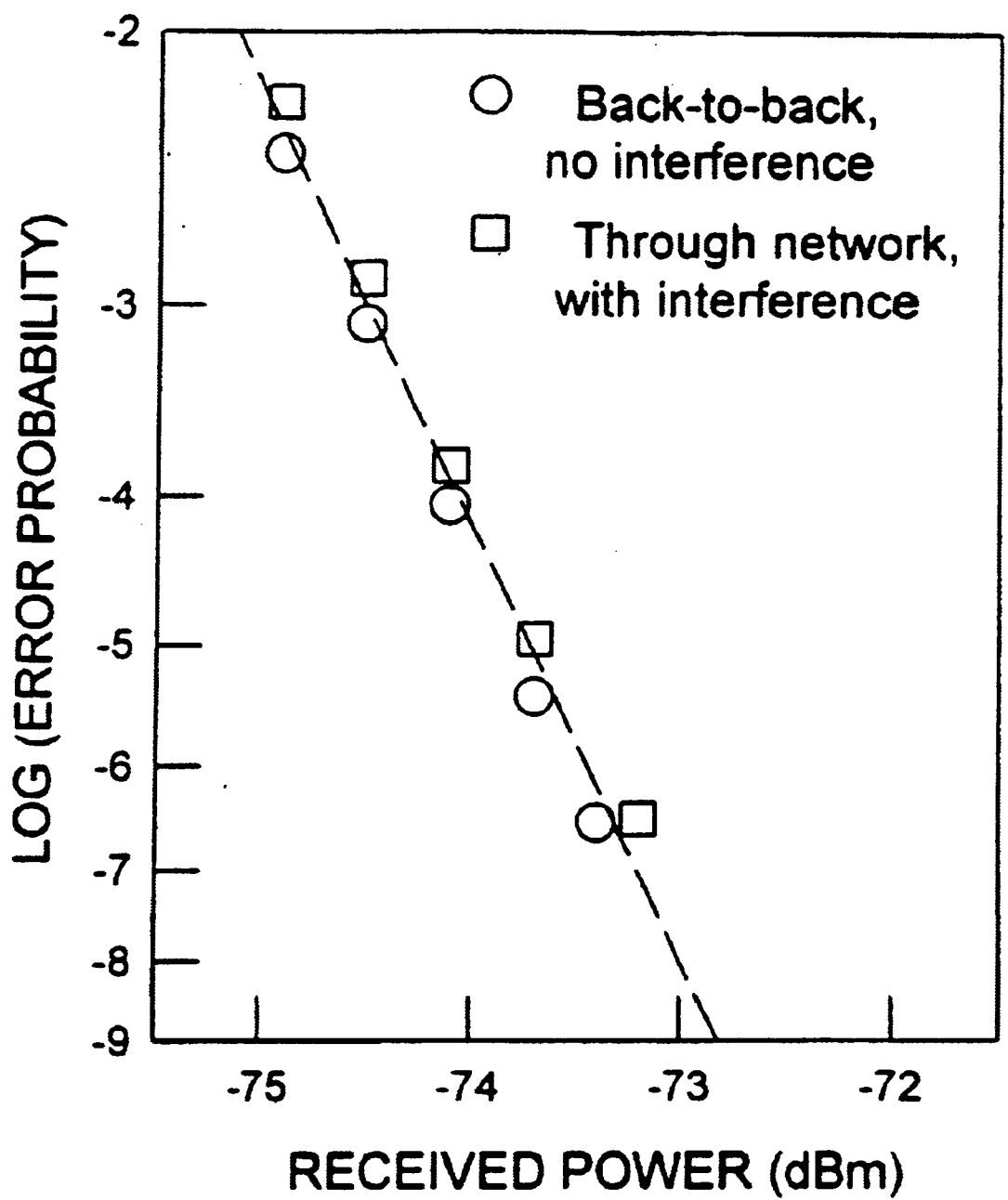
FIG. 4 shows a graph of bit error rate as a function of received optical power using a 10 kb/s pseudo-random data stream.

My inventive method also permits the transmission of low bit rate data with the reflective modulator. With reference now to FIG. 4, there is shown bit error rates as a function of received optical power using a 10 kb/s, pseudorandom data stream. As before, no penalty is observed when data taken through the optical network are compared with data taken back-to-back and there is no further degradation resulting from operating the upstream and downstream transmitters.

Figure 5:
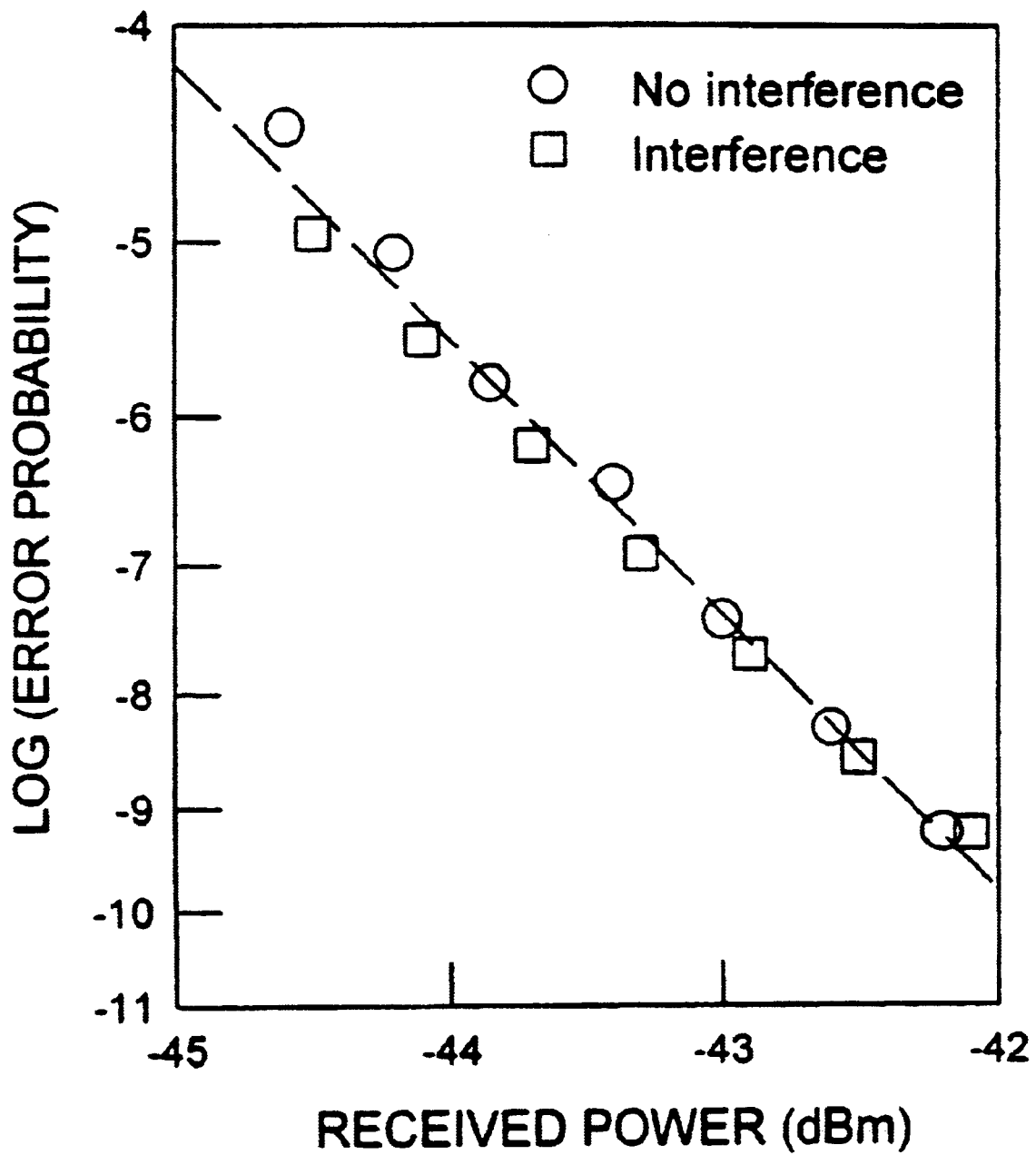
FIG. 5 is a graph showing bit error rate measurements taken with upstream and downstream transmitters each operating at 155 Mb/s.

FIG. 5 shows bit error rate measurements taken with upstream and downstream transmitters each operating at 155 Mb/s. As can be seen, there is no impairment resulting from operating all of the sources and modulator(s) simultaneously. Consequently, and an important aspect of my invention, one can operate a modulator in this configuration to test a fiber path to one particular ONU without disrupting traffic to or from other ONUs. One can also periodically test the function of the modulator without disrupting regular traffic. As can be appreciated, the periodicity of this test is rather subjective, and can vary from very short periods (i.e., 1 second or less) to very long periods (hours, days or weeks).

Figure 6A:
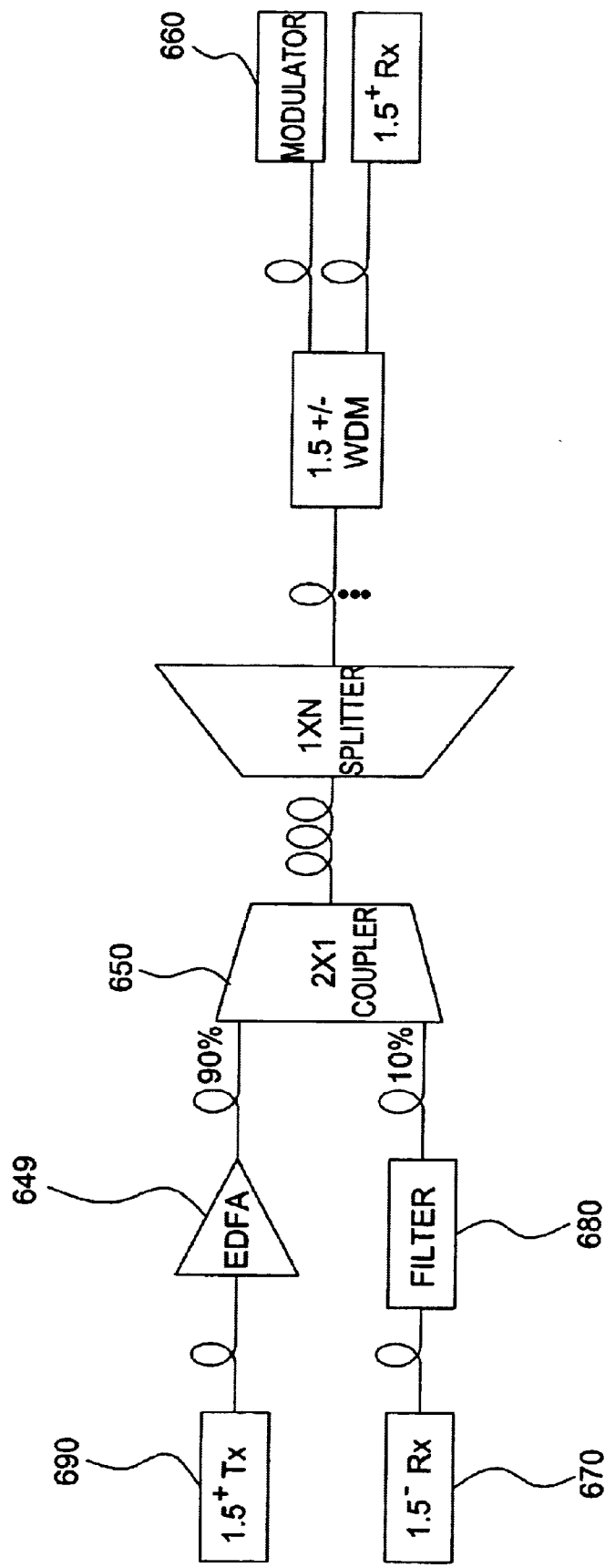
FIG. 6a shows in simplified block diagram form, a branched optical network according to the present invention including a downstream fiber amplifier.

With reference now to FIG. 6a, there is shown an exemplary embodiment of my invention in which a downstream transmitter is amplified by an optical amplifier 649. For simplicity, only those components essential for downstream transmission and modulator operation are shown. As can be appreciated, components essential for upstream transmission at, for example 1.3 $\mu$m can be added to this figure and its representative system if desired.

Figure 6B:
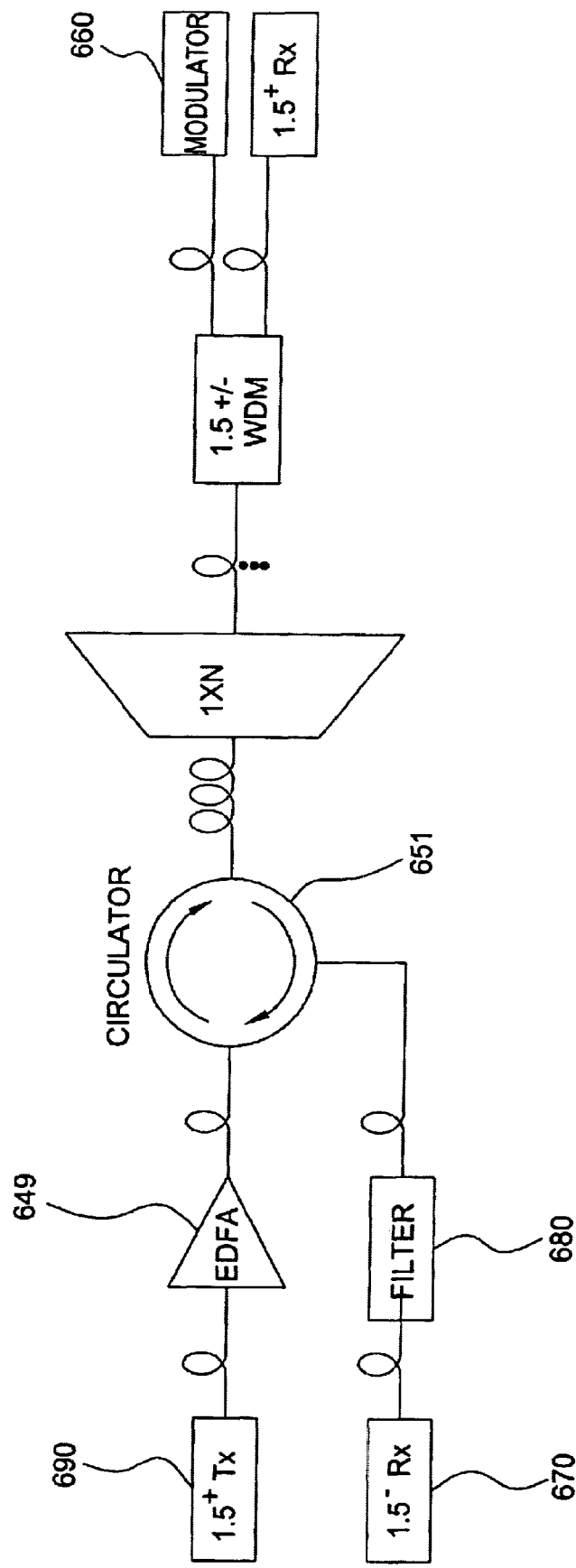
FIG. 6b shows in simplified block diagram form, a branched optical network according to the present invention including a downstream fiber amplifier and a circulator.

In addition to amplifying the downstream signal, the optical amplifier 649 will produce a broad-spectrum amplified spontaneous emission (ASE). In an erbium-doped fiber amplifier (EDFA) for example, the ASE has a peak near 1.53 $\mu$m. This portion of the ASE spectrum can be used as the light source for the modulator. On a return path, an optical circulator 651 (FIG. 6b) or a splitter (not shown) can direct light reflected from the downstream modulator 660 to a receiver 670. An optional optical filter 680 may be used optically in front of the receiver 670 thereby isolating it from reflections of light from the 1.5+$\mu$m transmitter 690.

Figure 7:
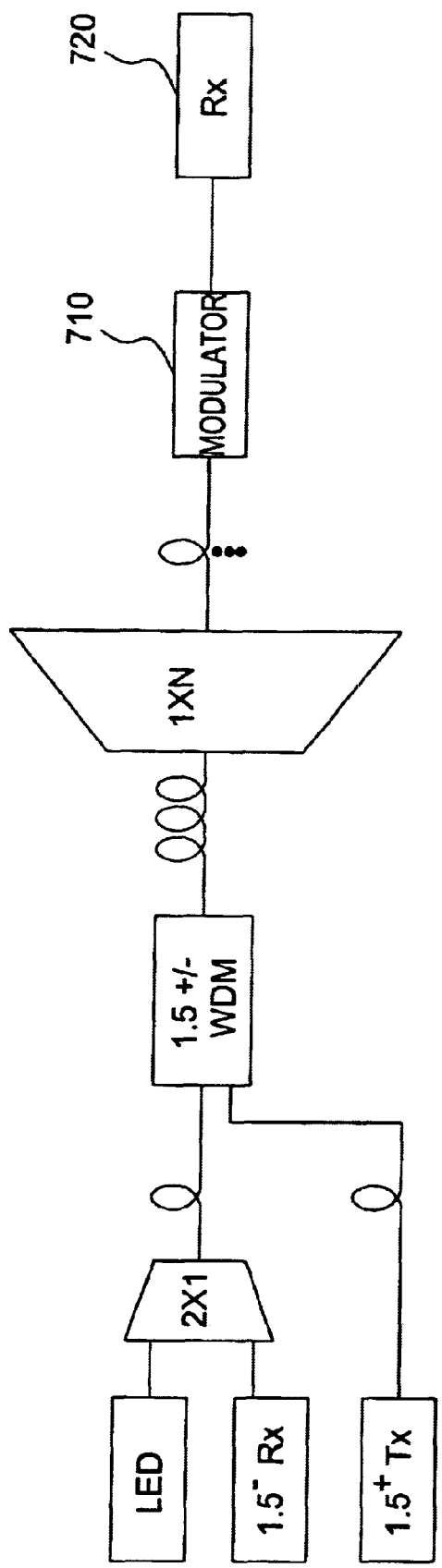
FIG. 7 shows in simplified block diagram form, a branched optical network according to the present invention including an integrated receiver/modulator at the ONU.

Finally, with reference to FIG. 7, a reflective modulator 710 is integrated with a receiver 720. Such integration is possible in some designs of reflective modulators. This integrated configuration of FIG. 7 lowers the cost of the ONU by eliminating the need for a 1.5 $\mu$m+/− WDM, although there may be some loss of receiver sensitivity, and operation of the modulator may not be completely non-intrusive. Extensions such as those described previously, for example, using an optical amplifier or circulator is possible as well.

With these inventive notions in place, a number of fault scenarios can be readily envisioned. Specifically, a loss of signal from an ONU may result from any of a number of failures including: 1) the ONU transmitter may be inoperative; 2) the ONU receiver may be inoperative; 3) a power failure may have occurred at the ONU; and 4) there may have been a transmission fiber cut or break.

In scenario 1, above, there will be a loss of incoming signals at the central office so the central office may instruct the ONU to activate the modulator. In scenario 2, a loss of signal at the ONU will result as well, so it cannot receive instructions from the central office to activate the modulator. Consequently, the ONU may activate the modulator when it loses an incoming signal. With respect to scenario 3, battery back up for the modulator is readily implemented, such that the modulator battery back up becomes active upon power failure. Finally, with respect to scenario 4, there will be no communication at all to or from the ONU. Consequently, storing "known" or "control" signatures will facilitate identification and isolation of network faults.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. A method of determining faults in a branched optical network, the method comprising the stops of:

transmitting, from a central office to a plurality of optical network units, dedicated broadband optical signal along a plurality of optical paths connecting the central office to the to the plurality of optical network units, wherein the dedicated broadband opticai signal is not a portion of a data transmission signal or derived from a data transmission signal;

reflecting, through action of a modulator situated within the optical network units, a selected portion of the dedicated broadband optical signal back to the central office; and determining, from the reflected signal, whether a fault exists in one or more of the optical paths.

2. The method according to claim 1, further comprising the step of:

selecting a particular modulator or modulators situated within particular optical network units: and enabling the modulator(s) such that they reflect a portion of the transmitted optical signal.

3. The method according to claim 2 further comprising the step of:

generating a set of signature reflective signals comprising the steps of:

transmitting, from the central office the dedicated broadband optical signal to the plurality of optical network units; and storing the signature reflective signals such that a subsequent comparison may be made between the stored signature(s) and a reflected signal(s).

4. The method according to claim 2 wherein the modulator is a micro-mechanical antireflective switched modulator (MARS) device.

5. The method of claim 1, wherein said dedicated broadband optical signal is generated by an LED.

6. In a branched optical network includIng a central office optically connected to a plurality of optical network units by a plurality of optical paths, a method of determining faults within the optical network, the method comprising the steps of:

transmitting a dedicated broadband optical signal from the central office to the plurality of optical network units via the optical paths, wherein the dedicated broadband optical signal is not a portion of a data transmission signal or derived from a data transmission signal;

selectively enabling, selected reflective modulators contained within the optical network units such that a portion of the dedicated broadband optical signal is reflected back to the central office via the optical paths; and determining, based upon the reflected signals, whether a fault exists within the branched optical network.

7. The method according to claim 6 further comprising the step of:

generating a set of signature reflective signals such that the determining step utilizes the signature reflective signals to determine whether a fault exists within the branched optical network.

8. The method according to claim 7 wherein the generating step includes the steps of:

transmitting, from the central office the dedicated broadband optical signal to the plurality of optical network units; and storing the signature reflective signals such that a subsequent comparison may be made between the stored signature(s) and a reflected signal(s).

9. The method according to claim 6 wherein the modulators are micro-mechanical anti-reflective membrane switch (MARS) devices.

10. The method of claim 6, wherein said dedicated broadband optical signal is generated by an LED.

* * * * *